(12) United States Patent
Brooks

(10) Patent No.: US 10,132,621 B1
(45) Date of Patent: Nov. 20, 2018

(54) REMOTE LIGHT BASED ANGLE SENSING INSTRUMENT

(71) Applicant: Lan Elliot Brooks, Colorado Springs, CO (US)

(72) Inventor: Lan Elliot Brooks, Colorado Springs, CO (US)

(*) Notice: Subject to any disclaimer, the term of this patent is extended or adjusted under 35 U.S.C. 154(b) by 211 days.

(21) Appl. No.: 14/574,380

(22) Filed: Dec. 17, 2014

Related U.S. Application Data

(60) Provisional application No. 61/917,396, filed on Dec. 18, 2013.

(51) Int. Cl.
   *G01B 11/26* (2006.01)
   *G01S 17/42* (2006.01)
   *G01S 7/481* (2006.01)

(52) U.S. Cl.
   CPC ............ *G01B 11/26* (2013.01); *G01S 7/4813* (2013.01); *G01S 17/42* (2013.01)

(58) Field of Classification Search
   None
   See application file for complete search history.

(56) References Cited

U.S. PATENT DOCUMENTS

| | | | | |
|---|---|---|---|---|
| 5,268,731 A * | 12/1993 | Fuchiwaki | ......... | G01B 11/2755 33/203.12 |
| 6,412,183 B1 * | 7/2002 | Uno | ................... | G01B 11/2755 33/203.12 |
| 7,204,030 B1 * | 4/2007 | Kattar | ...................... | G01B 3/56 33/286 |
| 7,639,346 B2 * | 12/2009 | Booker, Jr. | .............. | G01C 1/00 356/152.1 |
| 8,049,875 B1 * | 11/2011 | Brooks | .................. | G01B 3/563 356/139.05 |
| 2003/0218736 A1 * | 11/2003 | Gogolla | .................... | G01C 3/08 356/3.1 |
| 2008/0276472 A1 * | 11/2008 | Riskus | ................. | G01C 15/008 33/284 |
| 2015/0000144 A1 * | 1/2015 | Yuen | ........................ | G01B 7/30 33/228 |
| 2015/0037045 A1 * | 2/2015 | Dumoulin | ............ | G01C 15/004 398/162 |

FOREIGN PATENT DOCUMENTS

CA          2765890 A1 *  7/2013  ............. G01B 11/26

* cited by examiner

*Primary Examiner* — Charlie Y Peng
(74) *Attorney, Agent, or Firm* — Lan E. Brooks

(57) ABSTRACT

An instrument, for measuring and setting the angle between two work-pieces, that is placed on one of the work-pieces so that it projects two laser spots onto the second work-piece at which time a measurement is made of the distance along each of these laser axes which, combined with a known angle between the two axes allows the instrument to determine then display the angle between the two work-pieces allowing the user to read the angle and adjust the angle if needed.

6 Claims, 8 Drawing Sheets

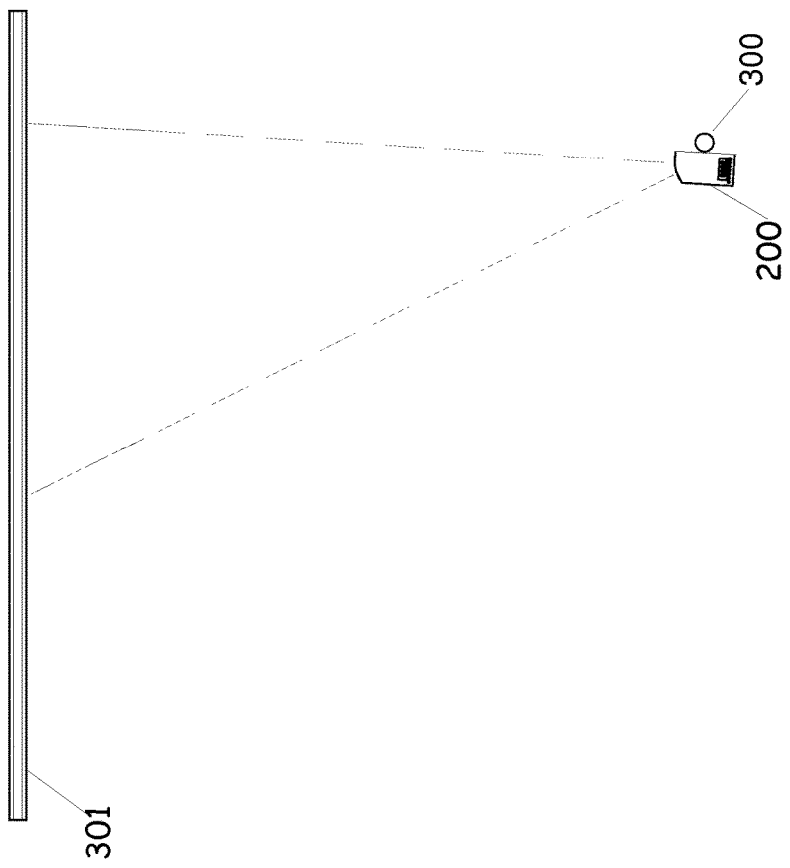

REMOTE LIGHT BASED ANGLE SENSING INSTRUMENT

CROSS-REFERENCE TO RELATED APPLICATIONS

Figure 1:
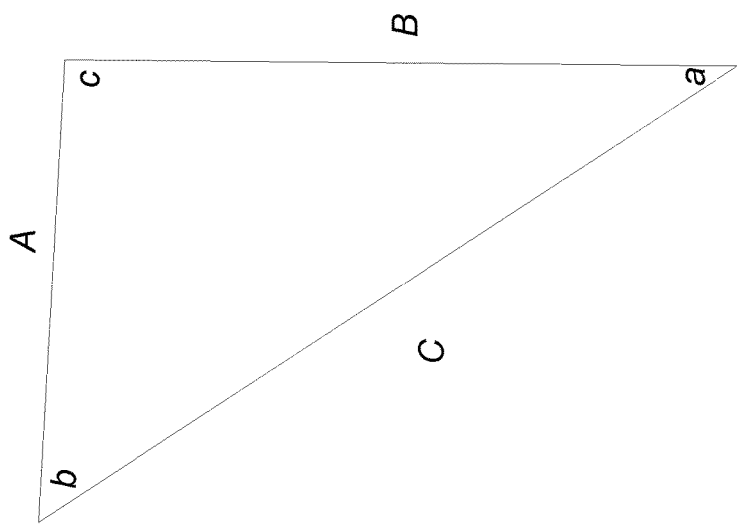

This application claims the benefits of provisional patent filing No. 61/917,396

FEDERALLY SPONSORED RESEARCH

Not Applicable

SEQUENCE LISTING OR PROGRAM

Not Applicable

BACKGROUND

Field

This application relates to squares and protractors used in the construction and other trades.

Background

Squaring devices and protractors having lasers for alignment are known. Some squares provides two and three simultaneous laser output beams at 90° and are placed at the apex of the angle being squared or set. Other device includes a laser and operable dial, wherein the dial allows the user to adjust the angle of the projected beam and again these instruments are used by placing them at the apex of the angle being adjusted.

Laser distance measurement devices are also well known. In many cases these laser distance measuring devices provide a crude Pythagorean function that allows the length of a remote object to be measured by taking two measurements from a handheld fixed location. These two measurements are then combined to calculate the length of the third leg of a triangle. One limitation is that one of the measurements must be at a right angle to the remote object being measured. In addition, a steady hand is required to get reasonably accurate distance measurements for the calculation and no provision is made for reading out any of the angles.

Digital protractors are also well known that have a pair of legs and that display the angle between the legs for measurement purposes. Such tools only operate at the junction of the two work pieces and cannot be used to make measurements at a distance from that junction.

A need exists for a compact handheld device that can be used to automatically measure angles and distance while place at a distance from the junction of two work pieces. Such a device would need to take accurate measurement of the appropriate distances while maintaining the correct angular relationship between the two measurements so that accurate calculations can be made of both the unknown angles and distances. Such an instrument would be suitable for use by professionals in the machining, woodworking, carpentry and construction trades, and by laymen in general household applications.

Additionally, the need also arises to create angle references during the layout phase of a project in which case this device can be used to measure the angle between its own base and a distant member at which point the base can be used as a guide for creating layout marks.

SUMMARY

In accordance with one embodiment, a hand held instrument that is held against one member while measuring the angle between that member and a second intersecting member, comprises a pair of laser distance measurement modules mounted to measure a pair of distances to the second member along two separate paths at known angles to one another, a conversion unit for calculating the inter-member angle based on the two measured distances and the known angle and a display for presenting the calculated inter-member angle to the user.

The device may also be used to create layout marks by measuring the angle between the base of the device and a member located at a distance from the device.

DRAWINGS

FIG. 1 is a drawing of a generalized triangle

Figure 2:
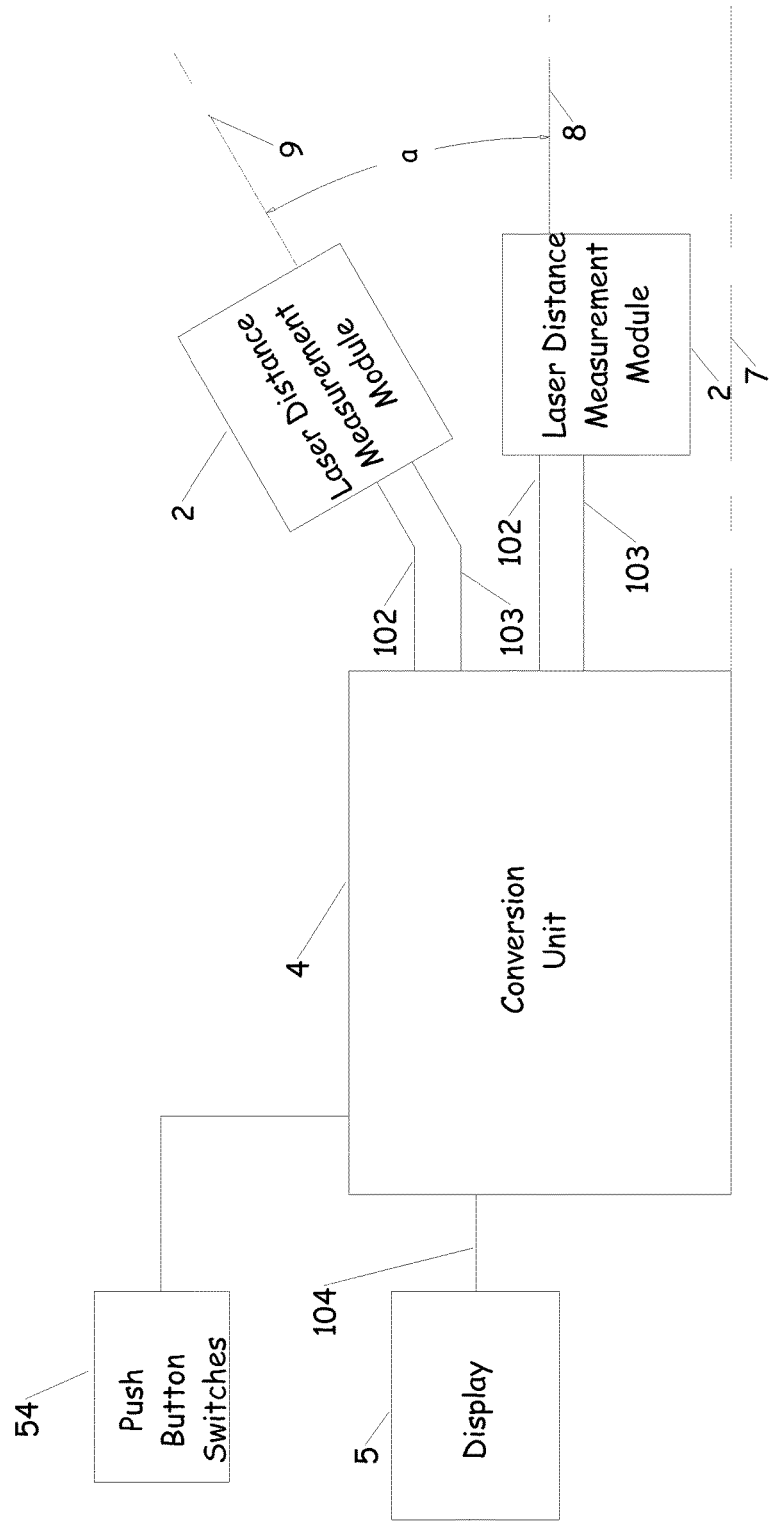
Figure 3:
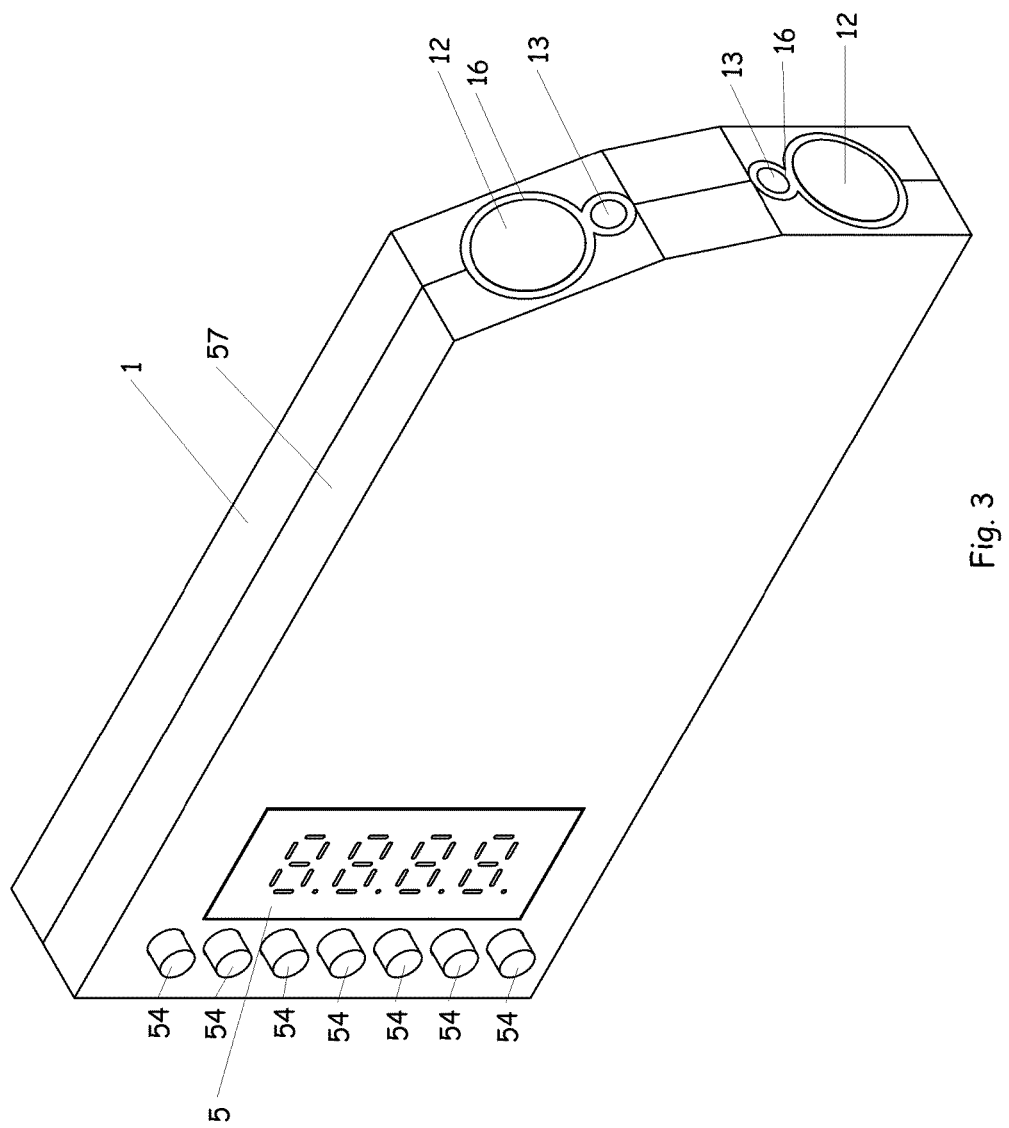
Figure 4:
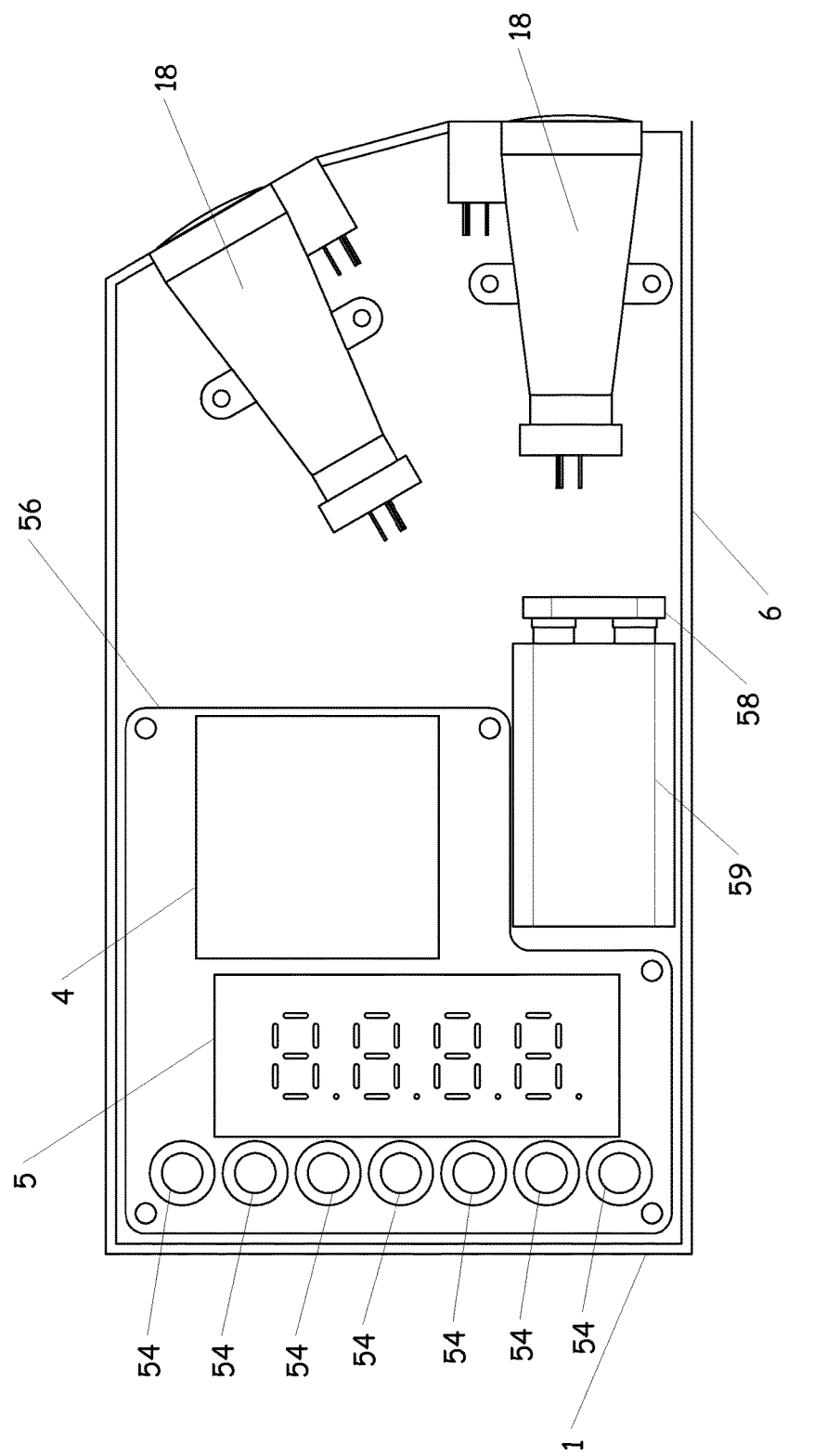
Figure 5:
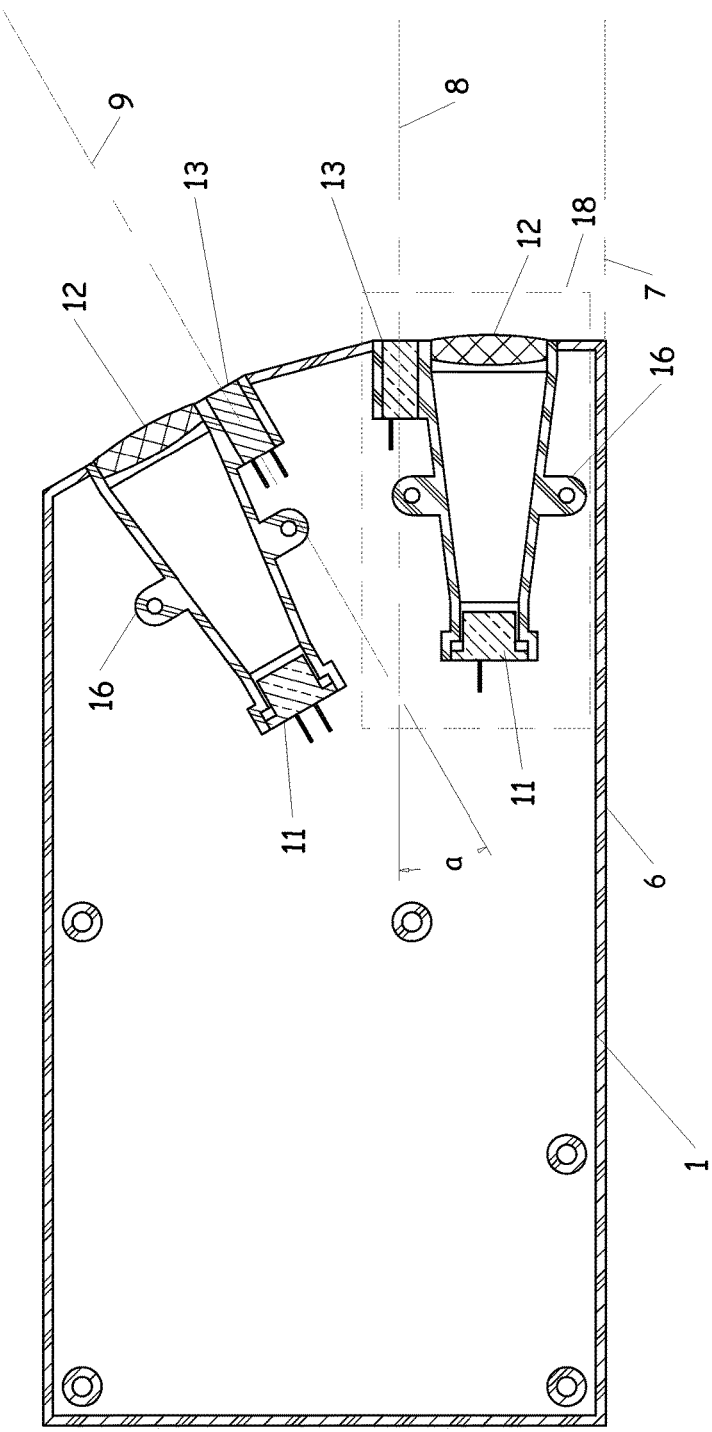
Figure 6:
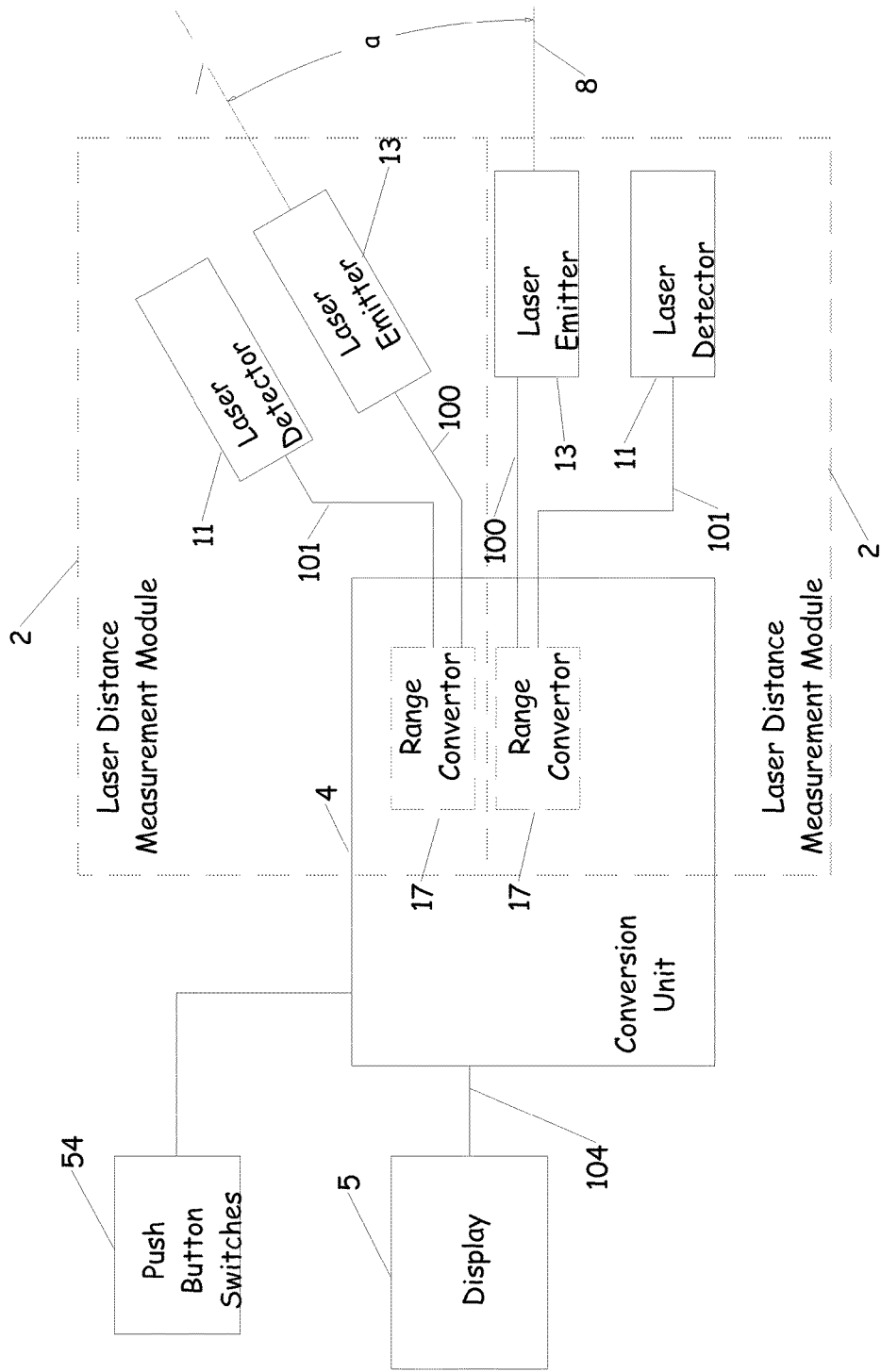
Figure 7:
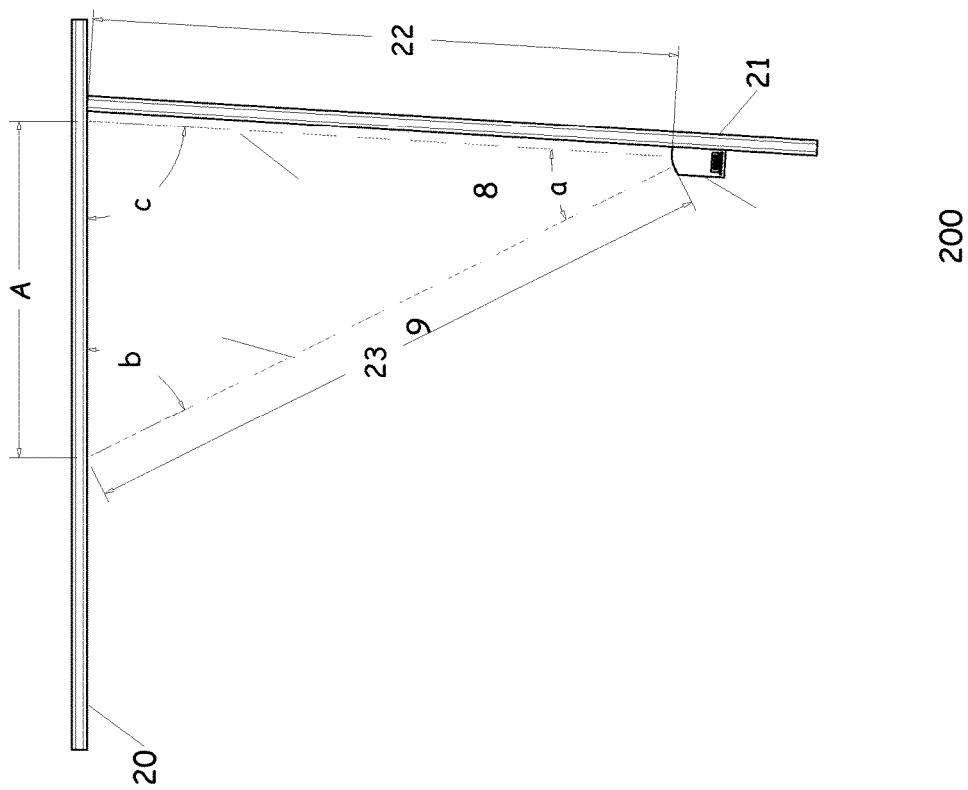

FIG. 2 is a block diagram of a typical embodiment utilizing commercially available components with the range convertor functionality built into the laser transceiver FIG. 3 is a perspective of a typical embodiment FIG. 4 is a front view of a typical embodiment with the cover removed FIG. 5 is a sectional view of a typical embodiment showing internal details of the laser transceiver, other internal items not shown FIG. 6 is a block diagram of a typical embodiment with the range convertor functionality built into the conversion unit FIG. 7 is a diagram showing how the instrument is used FIG. 8 is a diagram showing an alternate use of the instrument

THEORY OF OPERATION

The operation of this instrument is based on laser distance measurement principles and three commonly known trigonometric laws:

The Law of Cosines:

$$A^2 = B^2 + C^2 + 2\,BC\cos a \qquad \text{Equation 1:}$$

The Law of Sines:

$$(\sin a)/A = (\sin b)/B = (\sin c)/C \qquad \text{Equation 2:}$$

Which can be rewritten to yield:

$$b = \arcsin((B/A)(\sin a)) \qquad \text{Equation 3:}$$

The sum of the angles in a triangle equal 180 degrees:

$$180 = a + b + c \qquad \text{Equation 4:}$$

As shown in FIG. 1: a, b and c represent the vertices of a triangle and A, B and C represent the length of the sides of the triangle opposite the corresponding angle. From Eq 1, if angle a has a fixed value, and sides B and C are determined through measurement, the length of side A can be determined. Once the length of side A is calculated, the result can be used in equation 3 to determine angle b. Equation 4 can then be used to calculate angle c. At this point the lengths of all of the legs and the value for all of the angles in the triangle are known.

To the length of the two measured sides is determined with a pair of laser distance measurement modules. At the time of manufacture, the angle between the laser axes of the two laser distance measurement modules becomes fixed and constant making the angle a a known entity. The two laser distance measurement modules can use any number of techniques for determining distances such as time-of-flight or phase based distance measurements. *Optoelectronics: Theory and Practice*, by Allen Chappel (ISBN 0-07-063755-5), Chapter 23 provides an excellent description on phased based distance measurement techniques. U.S. Pat. No. 3,900,259 is one example of an implementation of a phase based distance measurement device whereas U.S. Pat. No. 7,359,039B2 provides a modern example of a time-of-flight distance measurement device. "A Low-Cost Laser Distance Sensor" by Kurt Konolige et al, presented at the 2008 IEEE International Conference on Robotics and Automation, Pasadena, Calif., USA, May 19-23, 2008 provides a description of a parallax based laser distance meter. Any of these and other techniques for laser distance measurement are excellent candidates for the laser distance measurement function in this invention with the choice of technique be based on the desired balance of the economic, precision and speed of acquisition needed for a particular implementation.

DESCRIPTION

While the invention can be embodied in many different forms, this specification and accompanying drawings disclose a pair of preferred forms as examples of the invention. The invention is not intended to be limited to the embodiments so described. The scope of the invention is identified in the appended claims.

The basic fundamental parts required to implement this invention are a body 1 which includes a base 6 for aligning the instrument or as a reference for creating layout marks, a laser distance measurement module 2 to measure the reference distance 22 along the reference measurement light beam axis 8, a laser distance measurement module 2 to measure the diagonal distance 23 along the diagonal measurement light beam axis 9, a conversion unit 4 that uses the two measured distances and the angle between the two measurement axes, a, to calculate one or more of b, c or A in FIG. 1, and a display 5 to present the resulting values to a user.

The body 1 can be machined, injection molded, cast or produced by any manufacturing process that provides the desired balance of cost versus accuracy. The body 1 holds all of the essential elements of the instrument in correct relationship to one another. The body will have a base 6 that is used to position the instrument against a movable work piece 21, thus aligning the reference measurement light beam axis 8 parallel to the surface of a work piece 21. One laser distance measurement module 2 will be mounted to the body 1 so that the axis of the projected laser beam is coincident with the reference measurement light beam axis 8 which is parallel to the base 6. A second laser distance measurement module 2 will be mounted to the body 1 so that the projected laser beam is co-linear with the diagonal measurement light beam axis 8 which is at the desired angle a to the reference measurement light beam axis 8. The conversion unit 4, display 5 and any other ancillary parts such as switches, circuit boards and batteries will also be contained in or attached to the body 1. The base 6 of the body 1 may be flat, grooved, have a tapered edge or any other design as long as it serves the purpose of aligning the longitudinal axis of the body 7 to the work piece in the intended application. The angle between the reference and the diagonal laser distance measurement modules 2, angle a, is chosen when a particular implementation of the invention is designed and subsequently manufactured. The actual angle a chosen will be based on the specific anticipated use of the instrument or chosen to provide for simpler calculations within the conversion unit 4.

The reference and the diagonal laser distance measurement modules 2 are anticipated to be of similar design to reduce manufacturing costs but this is not necessary for the invention to function. The reference and the diagonal laser distance measurement modules 2 may also be incorporated into a single unit. Any implementation of a laser distance meter module 2 will work. Typical examples of complete off the shelf modules are the DLS-B 15 Distance Laser Sensor sold by DIMETEK, the LMC-J-0040-1 Laser Distance Measuring Device sold by SENTEK solutions, the #28044 Laser Range Finder from Parallax and the S80-YL0 from Datalogic. The laser distance measurement modules incorporated in the Johnson model 40-6001 Laser Distance Measure or the Stanley TLM99 Laser Distance Measurer are examples of laser distance measurement modules where all of the necessary optical and electro-optical components are present in a convenient module serving as a laser transceiver 18 but which require an external range convertor 17. The laser distance measurement module 2 is a logical grouping of functionality. The laser detector 11 and receiver optics 12 may be housed in a single physical receiver housing 10. The laser emitter 13 may be a discrete laser emitter with discrete columnating optics or may be a commercial laser emitter 13 which includes the laser emitter and columnating lenses in a single laser emitter 13 module. The receiver components and the laser emitter components may be incorporated into a single physical laser transceiver housing 16, although other arrangements are equally viable. The range convertor 17 may be an electronic circuit housed within the laser transceiver housing 16 or it may be part of a separate circuit or processor that also performs the function of the conversion unit 4. In the current art for general laser distance meters there are different arrangements for where the range conversion takes place and all of these arrangements are viable embodiments of this invention.

Once the reference distance 22 and the diagonal distance 23 have been measured they are adjusted by adding or subtracting offsets so that the measured distances reflect the distance from the apex of angle a to the measured work piece 20 along both the reference measurement light beam axis 8 and the diagonal measurement light beam axis 9. This adjustment may occur in either the range convertor 17 or the conversion unit 4.

Once adjusted values of the reference distance 22 and the diagonal distance 23 have been calculated, the conversion unit 4 will use these values along with the value for angle a to calculate the value selected by a user input device such as push button switches 54. Any convenient means of user selection is acceptable including but not limited to slide switches, push buttons, rotary switches and membrane switches. In some implementation there may not be any user selection such as the case where all, or a subset, of the six measureable parameters are displayed or where only a single parameter is displayed such as the angle between the measured work piece 20 and the reference work piece 21.

The calculation of the desired parameters is based on the following equations or derivations thereof:

$$A^2 = B^2 + C^2 + 2\ BC \cos a \qquad \text{Equation 1:}$$

$$(\sin a)/A = (\sin b)/B = (\sin c)/C \qquad \text{Equation 2:}$$

$$180 = a + b + c \qquad \text{Equation 4:}$$

The equations may be evaluated through any combination of algorithms, look-up tables and approximations depending on the implementation of the conversion unit 4 which may be one or a combination of discrete electronics, an embedded microprocessor or programmable logic devices.

Once the desired parameters have been determined, the conversion unit 4 will send appropriate signals to the display 5 to cause it to display the desired parameter in a human readable fashion. The display 5 may be, but is not limited to, an alphanumeric LCD, LED, OLED or plasma display; a LCD, LED, OLED or plasma bar graph showing displacement from a desired angle value; a LCD, LED, OLED or plasma discrete seven segment numeric display or a electromechanical galvanometer showing displacement from a desired angle value.

FIRST TYPICAL EMBODIMENT

The instrument shown as a block diagram in FIG. 2 is one typical embodiment of the invention implemented using off the shelf components.

The components are attached to a body 1 which provides mounting points and environmental protection for all of the components as well as the base 6 for alignment with the reference work piece 21 or as a reference for creating layout marks. The mounting points for the reference laser distance measurement module 2 and the diagonal laser distance measurement module 2 align them so that there is an angle a between the reference measurement light beam axis 8 and the diagonal measurement light beam axis 9 and the reference measurement light beam axis 8 is parallel to the longitudinal axis of the body 7 and parallel to the reference work piece 21 in operation.

The laser distance measurement modules 2 can be any of the commercially available modules previously mentioned.

The conversion unit 4 is a commercially available microcontroller module connected to the laser distance measurement modules 2 with the appropriate interface for the module such as rs-232 or rs-422. The conversion unit 4 is also connected to a commercial display 5 via the appropriate interface such as rs-232 or rs-422. The push button switches 54 are connected to parallel input pins on the conversion unit 4.

In operation the instrument is turned on and when the user selects a measurement push button switch 54 the conversion unit 4 detects the button press and initiates a measurements along the reference measurement light beam axis 8, to determine the measured reference distance 22 value, and the diagonal measurement light beam axis 9, to determine the diagonal distance 23 value, by sending laser range initiation signals 102 to each of the laser distance measurement modules 2. The laser range initiation signals 102 are interface appropriate commands, such as rs-232 serial commands. The laser range initiation signals 102 are sent in close time proximity to one another. Once the distance measurements have been completed on the laser distance measurement modules 2, the range values are sent back to the conversion unit 4 as laser range data 103 in interface appropriate format, such as rs-232 serial commands. The conversion unit 4 receives the laser range data 103 for the each of the measurement axes. The conversion unit 4 then makes any necessary adjustments to the range values to adjust the ranges to reflect the actual distances from the apex of angle a to the measured work piece 20. The conversion unit 4 then performs the necessary calculations to calculate the value corresponding to the push button switch 54 that was pressed. The calculated value is then sent to the display 5 as display drive data 104. The display 5 then displays the data to the user.

SECOND TYPICAL EMBODIMENT

The instrument shown in perspective in FIG. 3, with the cover 57 removed in FIG. 4 and shown as a cross section view in FIG. 5 is another typical embodiment of this invention. Shown is an instrument where the body 1 is injection molded. The body 1 provides mounting points for the reference distance measurement module 2, the diagonal laser distance measurement module 2 and a printed circuit board 56. The printed circuit board provides physical mounting as well as electrical inter-connections for the conversion unit 4, display 5, and push button switches 54. The battery 59 and battery contact 58 are retained within the body 1 by the cover 57. The reference and diagonal laser distance measurement modules 2 are identical and connected to the printed circuit board 56 with wires as is the battery contact 58. The laser distance measurement modules 2 have injection molded laser transceiver housings 16 into which the laser detector 11 and receiver optics are press fit. The laser detector 11 is a photo transistor and the receiver optic 12 is an injection molded plastic lens. The laser transceiver housing 16 also has provisions for a pressed in laser emitter 13 which is a commercially available module incorporating a visible light laser diode and columnating optics installed in a small tubular housing. The range convertor 17 is incorporated into the conversion unit 4 which is a microcontroller. The microcontroller reads the push button switches 54; provides a modulated drive signal to the laser emitter 13; digitizes the laser detector 11 output; converts the laser detector 11 output to a measured range value; applies any necessary adjustments to the measured range values to arrive at true range values; uses the known value of angle a and the two true range values to calculate the parameters selected by the push button switches 54; and then converts the result into appropriate drive signals for the four digit, seven-segment display.

FIG. 6 shows a block diagram of the instrument where the range converter functionality 17 is located in the conversion unit 4. In operation the instrument is turned on and when the user selects a measurement push button switch 54 the conversion unit 4 detects the button press and initiates a measurements along the reference measurement light beam axis 8, to determine the measured B range value, and the diagonal measurement light beam axis 9, to determine the measured C range value, by providing modulated laser drive signals 100 to each of the laser emitter 13. Both laser drive signals 100 are enabled at the same time although the signals may be enabled in an alternating pattern if desired. While emitting the laser drive signals 100 the detected laser return signals 101 are monitored and read into the range convertor 17. The range convertor 17 converts the detected laser return signals 101 into range values which are sent to the conversion unit 4. The conversion unit 4 receives the range values for the each of the measurement axes. The conversion unit 4 then makes any necessary adjustments to the range values to adjust the ranges to reflect the true range from the apex of angle a to the measured work piece 20. The conversion unit 4 then performs the necessary calculations to calculate the value corresponding to the push button switch 54 that was pressed. The calculated value is then sent to the display 5 as display drive data 104. The display 5 then displays the data to the user.

OPERATION

The user turns the example instrument 200 on then selects the parameter to be measured by pressing the associated push button switch 54. The user then places the base 6 of the body 1 against the reference work piece 21, as shown in FIG. 7, and ensures that the laser spots projected by the reference laser distance measurement module 2 and the diagonal laser distance measurement module 2 are present on the measured work piece 20. If the user is only taking a measurement the user notes the value on the display 5 and is finished. If the user is making an adjustment to the work pieces, the user adjusts the position of either the measured work piece 20 or the reference work piece 21 while observing the display 5 and stops making adjustments when the desired value is displayed and the two work pieces are in correct alignment. The user is finished. In operation, the decision which work piece is the measured work piece 20 and which is the reference work piece 21 is only a matter of convenience as the operation of the instrument is the same when placed against either work piece or when either work piece is moved in relation to the other.

If the example instrument 200 is being used to create layout lines, for a tile layout for example, the user turns the example instrument 200 on then selects the parameter to be measured by pressing the associated push button switch 54. The user can then hold the point of a pencil 300 against the spot on the floor where a line at a particular angle to the wall is desires. The user then places the base 6 of the body 1 against the pencil 300, as shown in FIG. 8, and ensures that the laser spots projected by the reference laser distance measurement module 2 and the diagonal laser distance measurement module 2 are present on the wall. If the user is only taking a measurement the user notes the value on the display 5 and is finished. If the user is making an adjustment to the work pieces, the user adjusts the position of either the measured work piece 20 or the reference work piece 21 while observing the display 5 and stops making adjustments when the desired value is displayed and the two work pieces are in correct alignment. The user is finished. In operation, the decision which work piece is the measured work piece 20 and which is the reference work piece 21 is only a matter of convenience as the operation of the instrument is the same when placed against either work piece or when either work piece is moved in relation to the other.

REFERENCE NUMERALS a,b,c—The angles of a triangle
A,B,C—The side opposite the corresponding angle
1—Body
2—Laser distance measurement module
4—Conversion unit
5—Display
6—Base
7—Longitudinal axis of the body
8—Reference measurement light beam axis
9—Diagonal measurement light beam axis
10—Receiver housing
11—Laser detector
12—Receiver optics
13—Laser emitter
16—Laser transceiver housing
17—Range convertor
18—Laser transceiver
20—Measured work piece
21—Reference work piece
22—Reference distance
23—Diagonal distance
54—Push button switch
56—Printed circuit board
57—Cover
58—Battery contact
59—Battery
100—Laser drive signal
101—Detected laser return signal
102—Laser range initiation signal
103—Laser range data
104—Display drive data
200—Example instrument
300—Pencil
301—Wall

I claim:

1. An instrument for measuring and setting the angle between a first member and a second member, said instrument comprising:
   a body having a base that aligns said instrument to a surface of the first of the members such that a reference measurement light beam axis is established parallel to the surface of said first member;
   a first laser distance measuring device for measuring a first distance from said instrument to said second member along said reference measurement light beam axis;
   a second laser distance measuring device for measuring a second distance from said instrument to said second member along a diagonal measurement light beam axis where said diagonal measurement light beam axis is established at a known angle to said reference measurement light beam axis whereby a vertex is created to which said first distance and said second distance can be adjusted to accommodate the positioning of said first laser distance measuring device and said second laser distance measuring device within said body;
   a conversion unit that uses said first distance, said second distance and said known angle to calculate a member to member angle between said first member and said second member and converts said member to member angle into a displayable angle measurement;
   a display that presents said displayable angle measurement to a user.

2. An instrument as in claim 1 also capable of displaying at least one of said first distance, said second distance and a distance along said second member between said diagonal measurement light beam axis and said reference measurement light beam axis.

3. An instrument as in claim 1 also capable of displaying at least one of said known angle, said member to member angle and a second member to diagonal measurement light beam axis angle.

4. An instrument as in claim 1 also capable of displaying at least one of said known angle, said member to base angle and a second member to diagonal measurement light beam axis angle.

5. An instrument for measuring the angle to a member, said instrument comprising:
   a body having a base such that a reference measurement light beam axis is established parallel to said base;
   a first distance measuring device for measuring a first distance from said instrument to said member along said reference measurement light beam axis;
   a second distance measuring device for measuring a second distance from said instrument to said member along a diagonal measurement light beam axis where said diagonal measurement light beam axis is established at a known angle to said reference measurement light beam axis whereby a vertex is created to which said first distance and said second distance can be adjusted to accommodate the positioning of said first laser distance measuring device and said second laser distance measuring device within said body;

a conversion unit that uses said first distance, said second distance and said known angle to calculate a member to base angle between said member and said base and converts said member to base angle into a displayable angle measurement;

a display that presents said displayable angle measurement to a user.

6. An instrument as in claim 5 capable of displaying at least one of said first distance, said second distance and a distance along said second member between said diagonal measurement light beam axis and said reference measurement light beam axis.

* * * * *